United States Patent [19]

Brennan

[11] Patent Number: 4,500,078

[45] Date of Patent: Feb. 19, 1985

[54] CHIMNEY FLUE INSERTION APPARATUS

[76] Inventor: Gerald J. Brennan, 710 Third St. S., Moorehead, Minn. 56560

[21] Appl. No.: 455,203

[22] Filed: Jan. 3, 1983

[51] Int. Cl.[3] .............................................. B23Q 1/00

[52] U.S. Cl. .................................... 269/46; 269/48.1; 269/238; 294/86.24; 294/97

[58] Field of Search ................ 294/97, 86.24; 29/261, 29/262; 269/46, 238, 48.1, 240

[56] References Cited

U.S. PATENT DOCUMENTS

| | | | |
|---|---|---|---|
| 57,447 | 8/1866 | Stockmar | 269/238 |
| 419,884 | 1/1890 | Richards | 269/238 |
| 460,883 | 10/1891 | Nugent | 269/238 |
| 881,496 | 3/1908 | Seaman . | |
| 1,106,983 | 8/1914 | Steiner . | |
| 1,169,004 | 1/1916 | Cargin . | |
| 1,235,237 | 7/1917 | Parsons . | |
| 1,403,589 | 1/1922 | Cinquini | 269/238 |
| 1,804,843 | 5/1931 | Santiago . | |
| 2,167,338 | 7/1939 | Murcell | 269/48.1 |
| 2,422,848 | 6/1947 | Peters | 294/97 |
| 2,610,888 | 9/1952 | Pace . | |
| 2,646,304 | 7/1953 | Chadwick . | |
| 2,778,671 | 1/1957 | Langston . | |
| 3,442,546 | 5/1969 | Bachman . | |
| 3,727,490 | 4/1973 | Diffenderfer et al. . | |
| 4,304,398 | 12/1981 | Crowell . | |

FOREIGN PATENT DOCUMENTS

| | | | |
|---|---|---|---|
| 494337 | 2/1976 | U.S.S.R. | 294/97 |

*Primary Examiner*—Robert C. Watson

*Attorney, Agent, or Firm*—Orrin M. Haugen; Thomas J. Nikolai; Douglas L. Tschida

[57] ABSTRACT

Multi-legged apparatus for frictionally engaging the interior of a chimney flue liner and inserting same in a chimney via a stanchion or multi-sectioned rods. Each L-shaped leg is containably and rotatably mounted to a center threaded rod. The legs are expandable via a moving carrier containing cantilever arms connected to each of said L-shaped arms, such that by moving said carrier up or down along said center rod, said arms radially expand or contract from said center shaft.

4 Claims, 3 Drawing Figures

CHIMNEY FLUE INSERTION APPARATUS

BACKGROUND OF THE INVENTION

The present invention relates to pipe handling apparatus and, in particular, to chimney flue insertion apparatus having L-shaped arms rotatably fixed along a threaded shaft and radially expanding or contracting therefrom via a moving carrier and a cantilever assembly coupling the carrier to the arms.

With the possible exception of modern multiple sectioned-metal lined chimneys, most chimneys have heretofore been constructed from masonry materials. Such chimneys are generally constructed around an interior clay flue lining (either circular or rectangular in cross section) and about which are spaced either masonry rings of an appropriate inside dimension to match the clay liner or stacked chimney brick. Although, in some instances, chimneys have been constructed without using a liner at all, typically, a masonry veneer is used to contain the clay liner and whereby the smoke and other combustion gases are exhausted to the outside.

While masonry chimneys are preferrable to metal chimneys, over time they may deteriate and necessitate replacement or repair. Typically, such repairs are necessitated where the flue liner is cracked, separated or otherwise broken so as to permit flue gases to escape from the flue and enter the space between the liner and the masonry blocks. Such situations can prove rather dangerous in that the heated gases tend to deterioate the masonry blocks and cement joints and/or in some cases start chimney fires. Chimney fires, in turn, are dangerous in that if the liner and masonry should crack, combustable materials will be exposed to the chimney fire.

Difficulty in repairing clay lined chimneys arises, however, in that once the chimney has been assembled, the sections of chimney flue are no longer readily accessible. In this regards, therefore, it is necessary with most old chimney flues, if they have not already collapsed, to break and remove the old flue from the bottom of the chimney via the clean out, before relining the chimney. While such preparation is difficult, it is more difficult to reline the chimney with new sections of clay flue, in that the flue sections are approximately 2 feet long, whereas the typical chimney extends 25 feet or more. Thus, it is necessary to individually and successively blindly stack the clay liners, one upon the other, until the entire chimney is relined. Concurrent with this relining is the necessity of properly aligning the individual flue sections as well as bonding the sections together with an appropriate refractory mortar.

Heretofore, such relining efforts have been either avoided as by filling the chimney cavity with an appropriate inflated balloon and filling the cavity with a concrete slurry (Bittman, M., Reline Your Chimney, Popular Science, pp. 118–124, October, 1982) or with a great deal of difficulty using ropes and individual hooks for grasping the sections. Alternatively, an inflatable setting tool (ACU-set) can be employed for individually containing and setting the flue sections, Id. p. 124.

Various other known alternative interior grasping mechanisms can also be found upon reference to U.S. Pat. Nos. 2,778,671; 1,804,843; 2,610,888; 1,169,004; 881,496; and 4,304,398. However, while such other structures serve the same general purpose as the present apparatus, they are distinguishable from the present invention in the details of their configurations and which will become more apparent upon a reading of the present description.

As mentioned in the above referenced article, the Acu-set tool is cost prohibitive for the average user and requires a great deal of care to avoid punctures during use. The present invention, however, offers a most cost effective and ruggedized tool that is more easily employed. In particular, the present invention contemplates a flue setting tool that is comprised of a center threaded shaft that contains a moving "screw follower" carrier and a rotatable sleeve that is fixed relative to the shaft. A plurality of L-shaped arms are coupled to the sleeve at the junction of the major and minor portions thereof and which couplings act as fulcrum points. Associated cantilever arms, in turn, couple the L-shaped arms to the moving carrier and whereby the L-shaped arms may be radially expanded or retracted by moving the carrier down or up the threaded rod.

The above referenced objects and advantages of the present invention, as well as others, will however become more apparent upon a reading of the following description, with reference to the following drawings.

SUMMARY OF THE INVENTION

A system and apparatus for replacing and/or repairing chimney flues. The system comprising a stanchion, supportable above a chimney, to which a block and tackle are affixed for raising and lowering a section of chimney flue and a flue holding assembly. The flue holding assembly comprises a threaded rod having a universal joint affixed to one end thereof. Spaced apart therefrom and along the threaded shaft is a rotatable sleeve mounted in fixed relation to the ends of said threaded shaft. Fingers radiating from sleeve member are individually coupled to the elbows or fulcrum points of L-shaped arms. A threaded moving carrier spaced along the shaft and coupled to the L-shaped arms via individual cantilever arms causes the L-shaped arms to radially expand or contract with respect to the center rod as the moving carrier is respectively moved down or up.

An alternative embodiment contemplates the use of a sliding movable carrier such that the L-shaped arms expand and contract by exerting appropriate pressure on the center rod. Another embodiment also contemplates the affixation of successive threaded rods to the universal joint for accommodating various depths of insertion within a chimney.

DESCRIPTION OF THE PREFERRED EMBODIMENT

Figure 1:
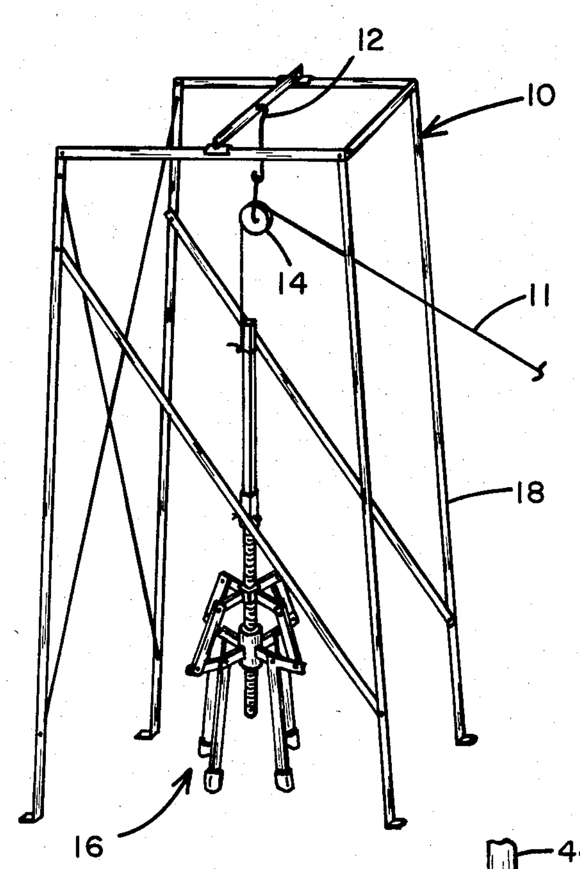
FIG. 1 shows a perspective view of the present system and the relation of the stanchion to the insertion tool.

Referring to FIG. 1, the present invention is shown in perspective view in relation to its primary elements. Specifically, the system is comprised of a foldable support stanchion 10 having a center cross member 11 and an associated block and tackle 12 suspended therefrom. Coupled to the block and tackle is the present flue grasping apparatus 13 and which during use is inserted within a flue liner 14 and rotated so as to cause the L-shaped arms thereof to expand and grasp the flue liner 14. Most typically the liner 14 is grasped by slightly extending the tip of the tool beyond the end of the liner, thereby facilitating the indexing or self-centering with the previous liner 14. However, the tips of the tool 13 may grasp the interior of the liner anywhere along its length.

The flue liner is then raised and lowered to an appropriate depth relative to the existing or replacement flue so as to permit the replacement of the lining thereof. Necessary motaring of the individual liners may be performed by appropriately buttering the upper or lower joint with an appropriate refractory mortar, prior to the lowering of each liner section 14.

As an alternative to the use of a support stanchion 10, individual sections of small diameter pipe or rod (e.g. ½ inch) may be coupled to the upper end of the present tool 13 so as to similarly permit the raising/lowering-/positioning of each flue liner 14. Such rods, as presently contemplated, are coupled to one another via a threaded coupling as well as to a universal joint 20 that is, coupled to one end of the tool 13. Thus, as each liner 14 is raised or lowered the universal joint 20 permits flexion so as to permit the directing of the liner 14 into position over the next lower section of liner 14.

Figure 2:
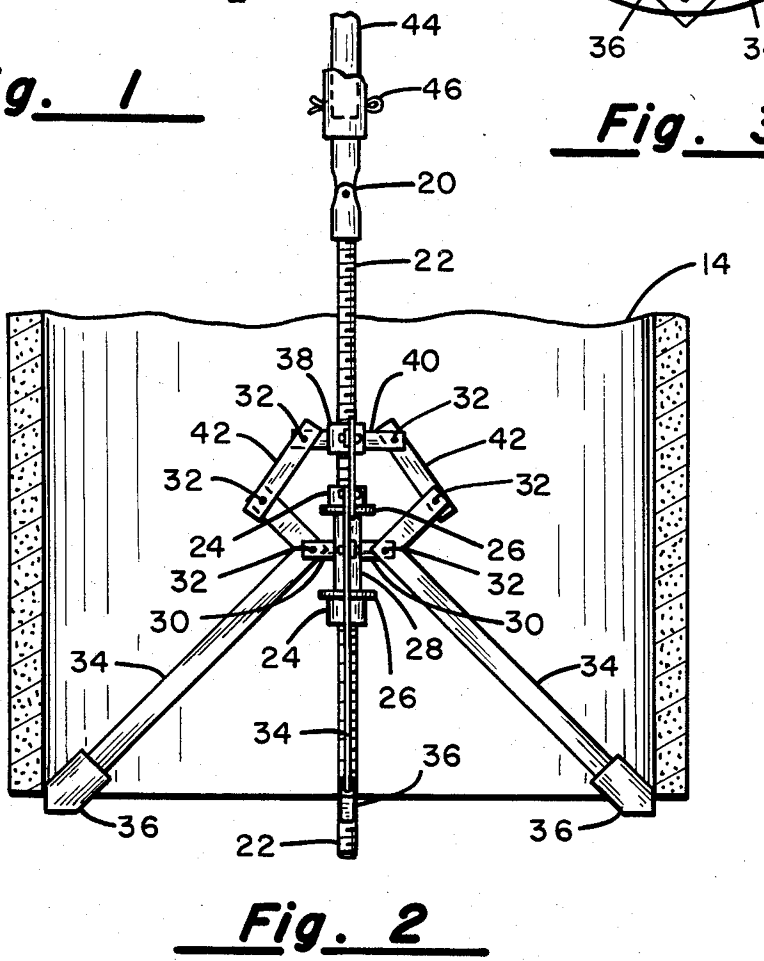
FIG. 2 shows a partially sectioned, detailed view of the present insertion tool relative to a typical flue liner.

Referring next to FIG. 2, a partially sectioned and detailed view is shown of the present flue grasping and insertion tool 13 relative to a typical clay flue liner 14. Specifically, the tool 13 is comprised of a threaded rod 22 that is coupled to the universal joint 20. Such a rod 22 is typically selected from a ⅝ inch threaded stock of approximately 2 feet in length. Spaced along the rod 22 and approximately 10 to 12 inches from the bottom end thereof are captured nuts 24 and washers 26 which are permanently affixed to the rod 22 as by means of welding. It is to be recognized though that alternatively such nut/washer assemblies may be captured via the abutting of a second nut 24 (not shown) against the primary nut 24 or via aircraft nuts with cotter pins or the like.

Intermediate the nut/washer assemblies is a sleeve 28 that is loosely contained between the washers 26 so as to permit the rotation of the sleeve about the rod 22. Radiating from the sleeve 28 are fingers 30 which are welded to the sleeve 28. For the present embodiment, the fingers 30 are made from a ¼ inch mild steel flat stock and are spaced about the sleeve 28 equidistant from one another. They are also each bored at their outermost ends for receiving a suitable bolt or rivet assembly 32. Affixed to each individual finger 30 at the bolts in a fulcrum fashion are, in turn, mounted the individual L-shaped arms 34.

The arms 34, as presently contemplated, are formed from a 1 inch by ¼ inch mild steel flat stock and the major portion is approximately 12 inches long while the minor portion is approximately 2 inches long. It is also to be noted that the end of the major portion is appropriately cut so as to present a flat lateral edge which may engage the interior surface of the liner. Most typically, too, short sections of rubber hose 36 are mounted about the cut leg ends so as to enhance the frictional characteristics thereof and the holding capacity of the assembly.

Shown in a spaced apart position relative to the captured sleeve 28 is a moving carrier 38 which for the present embodiment is comprised of a ⅝ inch nut and to which a number of fingers 40 made from a ⅝ inch by ¼ inch by ½ inch long mild steel flat stock are welded so as to radiate therefrom in the same fashion as the fingers 30. It should also be noted that the fingers 30 are typically fabricated to the same dimensions as the fingers 40.

Associated with each L-shaped arm 34 and finger 40 are cantilever coupling links 42 which are suitably coupled to the fingers 40 and the minor portions of the L-shaped arms 34 via appropriate bolts and/or rivet assemblies 32. Thus, upon screwing the movable carrier 38 up or down along the threaded rod 22, the coupling links 42 cause the L-shaped arms 34 to radiate inwardly and outwardly from the rod 22.

During use, and upon insertion of a "relaxed" tool 13 into a flue liner 14, necessary circulatory motion is exerted via a torque inducing rod 44 that is coupled to the universal joint 20. The turning of the rod 44, causes the movable carrier 38 to act in a screw follower relation and thereby impart the desired expansion or contraction to the L-shaped arms 34. For a stanchion system, it is to be noted that most typically a rope is tied off to the torque rod 44 and the twisting of the rope is sufficient to coact with the rod 44 and twist the threaded rod 22 so as to permit removal of the tool, once the liner 14 has been inserted. Alternatively, such twisting action is easily imparted via a system using multi-length rods 44. It is also to be noted that while various of the rod joints are threadably connected, they may be additionally pinned via a suitable cotter pin 46 so as to provide a positive action in both directions of rotation, without worrying about the uncoupling the threaded rods 44.

Figure 3:
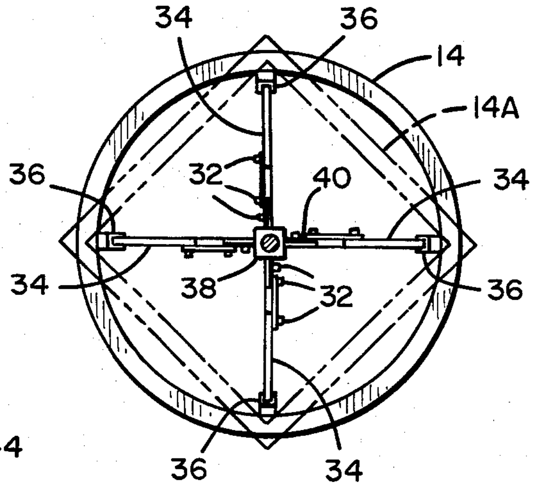
FIG. 3 shows a top view of the present apparatus in use, relative to typical clay liners of differing shapes.

Referring next to FIG. 3, a top view is shown of the present tool 13 as it would appear upon insertion into the more commonly available square and circular flue liners 14 and **14*a*. However, because flue liners are also available with rectangular cross sections, it is to be recognized that it may be desireable in such instances to replace various pairs of the cantilever coupling links 42 with links of other lengths or to use the same arm 42 but a different pivot hole so as to adjust the length of expansion of opposite arms 34 and thereby accommodate the different length diagonals that are encountered in a rectangular cross sectioned liners 14**.

It is also to be recognized that while the present invention has been described with respect to a threaded movable carrier 38, alternatively the present concept may be incorporated with a sliding carrier 38. For such an embodiment, it would be most advantageous to place the sleeve 28 above the carrier 38, such that the arms 34 would expand upon pulling upward rod 44. Thus, the mere exertion of a suitable pressure upward or downward on the rod 22 would cause the expansion or contraction of the arms 34. However, it is to be recognized that a more positive, shock insensitive holding force is obtained via the present threaded connection and which is accordingly preferred.

While the present invention has been described with respect to its preferred and various alternative embodiments, it is to be recognized that still other equivalent structures may suggest themselves to those of skill in the art without departing from the scope of the present invention. It is therefore contemplated that the above description and following claims should be interpretted so as to encompass all equivalent structures within the scope of the following claims.

What is claimed is:

1. Pipe stacking apparatus comprising in combination:

(a) a threaded rod;

(b) a jointed coupler attached to one end of said threaded rod and coupled to means for imparting a rotative force to said coupler and rod;

(c) a sleeve mounted about said rod so as to freely revolve therearound at a predetermined position along the length thereof and having a plurality of fingers radiating orthogonally therefrom;

(d) a plurality of L-shaped arms, each having a major portion of a length longer than a minor portion and each of said arms coupled to a respective one of said fingers at the juncture of the major and minor portions and the opposed outermost end of each major portion formed to grasp the inside of a pipe into which said pipe stacking apparatus is inserted and to extend therefrom a sufficient length to be insertable into a successively lower positioned length of pipe;

(e) a plurality of coupling links, each coupled at one end to be opposed outermost end of a respective one of the minor portions; and (f) screw follower means coupled to the opposite ends of said coupling links and threadably mounted to and rotatively movable along said rod for causing the pipe grasping end of the major portions of said L-shaped arms to expand or contract in a radial fashion relative to said rod, thereby grasping or releasing a length of pipe into which said apparatus is inserted and permitting the end-to-end stacking of lengths of pipe.

2. Pipe stacking apparatus as set forth in claim 1 including a rubber sleeve mounted to the outermost pipe grasping end of the major portion of each L-shaped arm, thereby increasing the frictional engagement with the interior of a pipe upon expanding said L-shaped arms.

3. Pipe stacking apparatus comprising in combination:

(a) a threaded rod;

(b) a jointed coupler attached to one end of said threaded rod and at least one extension rod mounted within said coupler and attached thereto via a pin mounted through coaxial holes in said coupler and extension rod for imparting a rotative force to said coupler and rod;

(c) a sleeve mounted about said rod so as to freely revolve therearound at a predetermined position along the length thereof and having a plurality of fingers radiating orthogonally therefrom;

(d) a plurality of L-shaped arms, each having a major portion of a length longer than a minor portion and each of said arms coupled to a respective one of said fingers at the juncture of the major and minor portions and the opposed outermost end of each major portion formed to grasp the inside of a pipe into which said pipe stacking apparatus is inserted and to extend therefrom a sufficient length to be insertable into a successively lower positioned length of pipe;

(e) a plurality of coupling links, each coupled at one end to the opposed outermost end of a respective one of the minor portions; and (f) screw follower means coupled to the opposite ends of said coupling links and threadably mounted to and rotatively movable along said rod for causing the pipe grasping end of the major portions of said L-shaped arms to extend or contract in a radial fashion relative to said rod, thereby grasping or releasing a length of pipe into which said apparatus is inserted and permitting the end-to-end stacking of lengths of pipe.

4. Apparatus for stacking a plurality of sections of chimney flue in an end-to-end fashion, comprising in combination:

(a) a stanchion mountable above a flueless chimney;

(b) block and tackle means coupled to said stanchion for raising and lowering a section of chimney flue relative to said chimney;

(c) at least one length of extension rod coupled at one end to said block and tackle means and attached at an opposed end to a jointed coupler via a pin mounted through coaxial holes in said coupler and extension rod; and (d) means attached to said coupler for grasping the inside of one of said sections of flue and aligning each section of flue relative to the next lower section, said flue grasping means comprising in combination;

(1) a threaded rod;

(2) a sleeve mounted about said rod so as to freely revolve therearound at a predetermined position along the length thereof and having a plurality of fingers radiating orthogonally therefrom;

(3) a plurality of L-shaped arms, each having a major portion of a length longer than a minor portion and each of said arms coupled to a respective one of said fingers at the juncture of the major and minor portions and the opposed outermost end of each major portion formed to grasp the inside of a section of flue into which said stacking apparatus is inserted and to extend therefrom a sufficient length to be insertable into a successively lower positioned section of flue;

(4) a plurality of coupling links, each coupled at one end to the opposed outermost end of a respective one of the minor portions; and (5) screw follower means coupled to the opposite ends of said coupling links and threadably mounted to and rotatively movable along said rod for causing the flue grasping end of the major portions of said L-shaped arms to expand or contract in a radial fashion relative to said rod, thereby grasping or releasing a section of flue into which said apparatus is inserted and permitting the end-to-end stacking thereof.

* * * * *

UNITED STATES PATENT AND TRADEMARK OFFICE

CERTIFICATE OF CORRECTION

PATENT NO. : 4,500,078

DATED : February 19, 1985

INVENTOR(S) : Gerald J. Brennan

It is certified that error appears in the above-identified patent and that said Letters Patent are hereby corrected as shown below:

Column 5, Line 19, "be" should read -- the --.

Signed and Sealed this

*Eleventh* Day of *June 1985*

[SEAL]

*Attest:*

DONALD J. QUIGG

*Attesting Officer* *Acting Commissioner of Patents and Trademarks*